United States Patent
Sogabe et al.

(10) Patent No.: US 7,176,964 B1
(45) Date of Patent: Feb. 13, 2007

(54) ELECTRONIC STILL CAMERA PROVIDED WITH A DISPLAY

(75) Inventors: Yoko Sogabe, Sakai (JP); Toshihiro Hamamura, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/076,700

(22) Filed: May 13, 1998

(30) Foreign Application Priority Data

May 14, 1997 (JP) .................................. 9-124292

(51) Int. Cl.
*H04N 5/225* (2006.01)
*H04N 5/222* (2006.01)

(52) U.S. Cl. .............................. 348/220.1; 348/333.05

(58) Field of Classification Search ................ 348/220, 348/231, 232, 333.01, 333.02, 333.03, 312, 348/333.05, 220.1, 231.99, 231.3; 396/238
See application file for complete search history.

(56) References Cited

U.S. PATENT DOCUMENTS

| 4,827,347 | A |   | 5/1989 | Bell |
|---|---|---|---|---|
| 5,450,129 | A | * | 9/1995 | Matoba et al. ............... 348/312 |
| 5,576,758 | A | * | 11/1996 | Arai et al. ................... 348/220 |
| 5,576,759 | A | * | 11/1996 | Kawamura et al. ..... 348/207.99 |
| 5,635,984 | A | * | 6/1997 | Lee ........................ 348/333.05 |
| 5,687,410 | A | * | 11/1997 | Sasagaki ..................... 396/238 |
| 5,751,350 | A | * | 5/1998 | Tanaka ....................... 348/220 |
| 5,767,904 | A | * | 6/1998 | Miyake ....................... 348/312 |
| 5,806,072 | A | * | 9/1998 | Kuba et al. ................. 348/231 |
| 5,905,528 | A | * | 5/1999 | Kodama ..................... 348/220 |
| 6,057,832 | A | * | 5/2000 | Lev et al. ................... 715/720 |
| 6,118,480 | A | * | 9/2000 | Anderson et al. ...... 348/207.99 |
| 6,137,534 | A | * | 10/2000 | Anderson .............. 348/333.01 |
| 6,342,900 | B1 | * | 1/2002 | Ejima et al. ........... 348/333.01 |

FOREIGN PATENT DOCUMENTS

| JP | 59-64984 | 4/1984 |
|---|---|---|
| JP | 63-62488 | 3/1988 |
| JP | 3-77489 | 4/1991 |
| JP | 3-198482 | 8/1991 |
| JP | 4-207478 | 7/1992 |
| JP | 4-335784 | 11/1992 |
| JP | 5-191700 | 7/1993 |
| JP | 5-328279 | 12/1993 |
| JP | 08191430 | 7/1996 |

\* cited by examiner

*Primary Examiner*—David Ometz
*Assistant Examiner*—Luong T. Nguyen
(74) *Attorney, Agent, or Firm*—McDermott Will & Emery LLP (57) ABSTRACT

An electronic still camera includes an image pickup unit for picking up an object image to generate a frame image, the image pickup unit having a single pickup mode of picking up an object image to generate a single frame image, and a continuous pickup mode of picking up an object image continuously to generate a plurality of continuous frame images, and a display unit for displaying a frame image in a display manner specialized to the pickup mode in which the frame image is generated. Each frame image is stored in a memory, and given with pickup mode information representing which the frame image is generated in the single pickup mode or the continuous pickup mode.

12 Claims, 7 Drawing Sheets

ELECTRONIC STILL CAMERA PROVIDED WITH A DISPLAY

This application is based on patent application No. 9-124292 filed in Japan, the contents of which is hereby incorporated by reference.

BACKGROUND OF THE INVENTION

This invention relates to an electronic still camera for picking up an object image and reproducibly recording the picked-up image in a storage medium.

In recent years, electronic still cameras have been known which pickup and convert an object image into electronic image data, and store the image data in storage medium such as IC card. Such an electronic still camera is internally provided with a display unit for reproducing an image so that the object image stored in the IC card can be reproduced, if necessary. This makes it possible for a photographer to confirm picked-up images, thereby enabling storage of only desired object images.

However, in the conventional electronic still cameras, picked-up images are reproduced or displayed frame by frame. Accordingly, instruction for frame feed has to be given for each frame. This operation is cumbersome in the case that a number of images are to be reproduced.

Also, for such electronic still cameras, there have been proposed a variety of image pickup modes to allow photographers to enjoy photography or image pickup. However, reproduction of picked-up images is routinely performed in response to an instruction given for each frame. Thus, it cannot be said that images are suitably reproduced in conformity with a variety of image pickup modes. Particularly, in the case of reviewing the respective circumstance and atmosphere of a plurality of continuously picked-up images by comparing them to one another, satisfactory comparison cannot be attained.

SUMMARY OF THE INVENTION

It is an object of the present invention to provide an electronic still camera which has overcome the problems residing in the prior art.

It is another object of the present invention to provide a frame image reproducer which has overcome the problems residing in the prior art.

It is another object of the present invention to provide an image picking-up method which has overcome the problems residing in the prior art.

According to an aspect of the present invention, an electronic still camera comprises: an image pickup unit which picks up an object image to generate a frame image, the image pickup unit having a single pickup mode of picking up an object image to generate a single frame image, and a continuous pickup mode of picking up an object image continuously to generate a plurality of continuous frame images; a display unit which displays a frame image; and a controller which controls the display unit to display a frame image in a display manner specialized to the pickup mode in which the frame image is generated.

According to another aspect of the present invention, an electronic still camera comprises: an image pickup unit which picks up an object image to generate a frame image, the image pickup unit having a single pickup mode of picking up an object image to generate a single frame image, and a continuous pickup mode of picking up an object image continuously to generate a plurality of continuous frame images; a mode setter which selectively sets one of the single pickup mode and the continuous pickup mode; a pickup mode information generator which generates pickup mode information for each frame image, the pickup mode information representing which the frame image is generated in the single pickup mode or the continuous pickup mode; and a storage medium which is operable to store frame images and pickup mode information respectively given to the frame images.

According to still another aspect of the present invention, a frame image reproducer is adapted for reproducing single frame images and a plurality of continuous frame images stored in a memory, the single frame images being generated in a single pickup mode, the plurality of continuous frame images being generated in a continuous pickup mode. The reproducer comprises: a frame image reader which reads a frame image from the memory; a discriminator which discriminates which a read frame image is generated in the single pickup mode or the continuous pickup mode; and a display unit which displays, based on a result of the discriminator, a read frame image in a display manner specialized to the pickup mode in which the frame image is generated.

According to yet still another aspect of the present invention, a method for picking up an object image electronically, the method comprises the steps of: providing an operator with selection of either a single pickup mode of picking up an object image to generate a single frame image or a continuous pickup mode of picking up an object image continuously to generate a plurality of continuous frame images; performing image pickup in accordance with a selected pickup mode; and displaying a frame image in a display manner specialized to the pickup mode in which the frame image is generated.

These and other objects, features and advantages of the present invention will become more apparent upon a reading of the following detailed description and accompanying drawings.

DETAILED DESCRIPTION OF THE PREFERRED EMBODIMENTS OF THE INVENTION

Figure 1A:
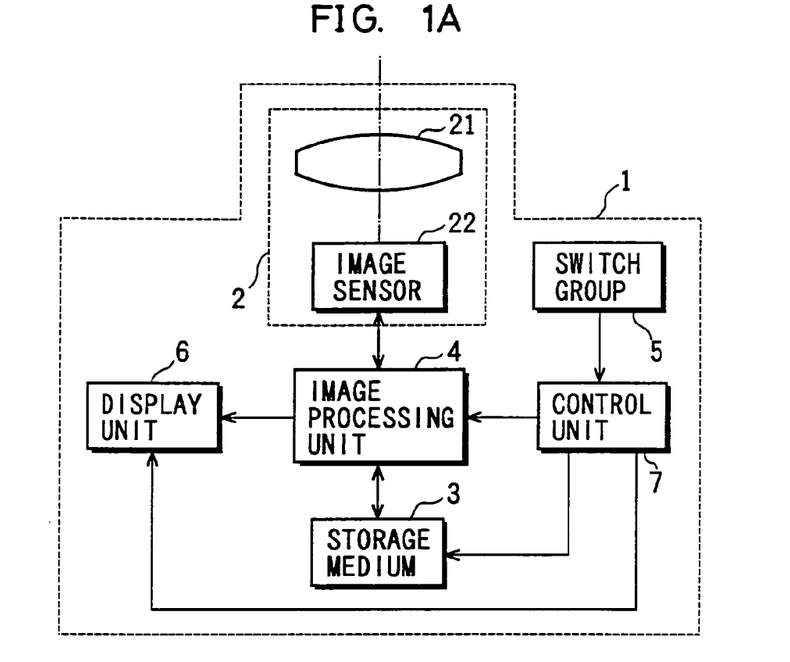
FIG. 1A is a diagram showing a construction of an electronic still camera according to one embodiment of the present invention.

FIG. 1A shows a construction of an electronic still camera embodying the invention. A camera 1 is provided with an image pickup unit 2 for picking up an object image, an image processing unit 4, a switch group 5 for instructing a variety of operations to the camera 1, a display unit 6 for displaying an image to be picked up or a reproduced image, and a control unit 7 for controlling the operations of these units. The image processing unit 4 processes picked-up image for display and record. The processed image data is stored or recorded on a storage medium 3 such as a built-in disk memory or a detachable IC memory. The image processing unit 4 includes a signal amplifier, A/D converter, and timing generator.

Figure 1B:
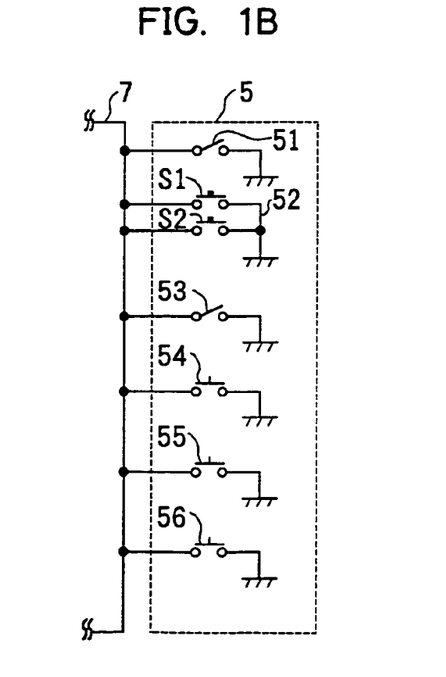
FIG. 1B is a diagram showing a construction of a switch group of the electronic still camera.

FIG. 1B is an exemplary construction diagram of the switch group 5 which includes a main switch 51, a release button 52 for instructing an image pickup preparation and an exposure, an image pickup/reproduction switch 53, a mode selection switch 54 for changing over three modes in the image pickup mode or two modes in the reproduction mode, a feed switch 55 used during the reproduction, and a rewind switch 56.

The image pickup unit 2 includes a taking lens 21 and an image sensor 22 as shown in FIG. 1A. One frame of object image is picked up in the case of a Single Pickup Mode, whereas a plurality of frames of object image are picked up in the case of a Continuous Pickup Mode or a Shutter Chance Mode. These three modes are described later.

The taking lens 21 is adapted to focus light from an object onto the image sensor 22 as an object image. The image sensor 22 includes photoelectric conversion elements such as CCDs (Charge Coupled Device) arrayed in a two-dimensional manner, and is adapted to sense an object image focused by the taking lens 21 and to obtain an electrical signal corresponding to an amount of received light. The image signal of the object image is obtained as a planar set of pixel signals which are electrical signals obtained by the respective photoelectric conversion elements by receiving the light. The taking lens 21 may be an exchangeable lens detachably mountable on a main body of the camera 1.

The image processing unit 4 causes the image sensor 22 to repeatedly sense light from an object in a specified cycle and receives pixel signals obtained by the respective photoelectric conversion elements by receiving the light in time series every time the light reception is completed. An instruction for this light reception is given to the image sensor 22 according to a predetermined charge storing period (integration period) so as to obtain a pixel signal having a processable level. After applying specified signal processings (including signal amplification, offset adjustment and A/D conversion) to a received pixel signal, the image processing unit 4 applies specified image processing (including black level correction, white level correction, gradation correction by means of a look-up table or the like) to obtained image data.

Further, the image processing unit 4 transfers the processed image data to the display unit 6 and stores it in the storage medium 3. The image processing unit 4 also generates an image data file by allotting tag information files generated by the control unit 7 to the processed image data, stores this image data file in the storage medium 3, reproduces the image data from the image data file stored in the storage medium 3, and transfers the reproduced image data to the display unit 6 in accordance with the tag information file in the image data file. It should be noted that the image processing unit 4 may compress the image data before it is stored in the storage medium 3 and expand the image data read from the storage medium 3 to be reproduced.

The main switch 51 activates the camera 1 when being turned on as shown in FIG. 1B, and stops the camera 1 when being turned off. The release button 52 turns a switch S1 on when being partly pressed, thereby causing the camera 1 to perform an image pickup preparation, while turning a switch S2 on when being fully pressed, thereby causing the camera 1 to perform an exposure.

The image pickup/reproduction switch 53, for example, sets the camera 1 in a reproduction mode when being turned on while setting it in an image pickup mode when being turned off. The camera 1 set in the reproduction mode by the switch 53 reproduces image data stored in the storage medium 3 and displays an image obtained by this reproduction on the display unit 6. Further, the camera 1 set in the image pickup mode picks up an object image according to an operation in response to the release button 52 and stores image data obtained by this image pickup in the storage medium 3.

The mode selection switch 54 cyclically changes over two reproduction modes to be selectively set each time being turned on. A reproduction mode selected by the mode selection switch 54 is set in the camera 1. Specifically, in the case that the camera 1 is set in the reproduction mode by the image pickup/reproduction switch 53, the mode selection switch 54 alternately changes over a Reproduction Mode I and a Reproduction Mode II each time being turned on, and the selected reproduction mode is set in the camera 1. On the other hand, in the case that the camera 1 is set in the image pickup mode by the image pickup/reproduction switch 53, the mode selection switch 54 cyclically changes the image pickup mode in the order of Continuous Pickup Mode, Shutter Chance Mode, and Single Pickup Mode each time being turned on, and the selected image pickup mode is set in the camera 1. In this embodiment, when the camera 1 is activated, the Single Pickup Mode is automatically set as an initial image pickup mode.

The Reproduction Mode I is such that a plurality of frame images are displayed in a multi-display format having a plurality of sections. The Reproduction Mode II is such that a plurality of frame images are displayed frame by frame at a specified interval.

The Continuous Pickup Mode is such that image pickup is repeated at a specified interval while the switch S2 is on. The Shutter Chance Mode is such that image pickup is repeated at a specified interval after the switch S1 is turned on in order to obtain images picked up before and after the on-timing of the switch S2 in addition to an image picked up when the switch S2 is turned on. In other words, at least three frames of picked-up images are obtained in the Shutter Chance Mode.

The frame feed switch 55 changes an image displayed on the display unit 6 each time being turned on, thereby causing an image picked up one frame after the image having been displayed to be displayed on the display unit 6. The frame rewind switch 56 changes an image displayed on the display unit 6 each time being turned on, thereby causing an image photographed one frame before the image having been displayed to be displayed on the display unit 6.

Figure 2A:
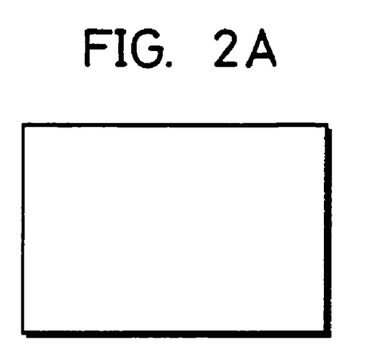
FIG. 2A is a diagram showing a normal display format for a display unit.
Figure 2B:
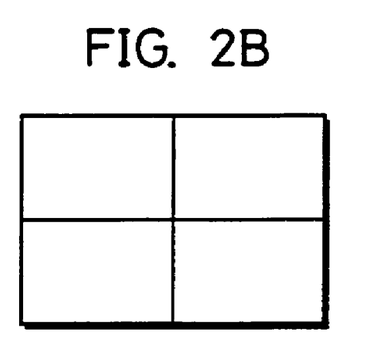
FIGS. 2B, 2C are diagrams showing a ¼ multi-display format for the display unit.
Figure 2C:
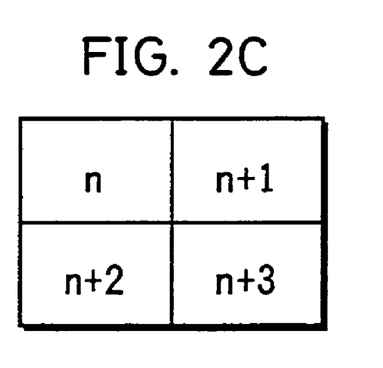
Figure 2D:
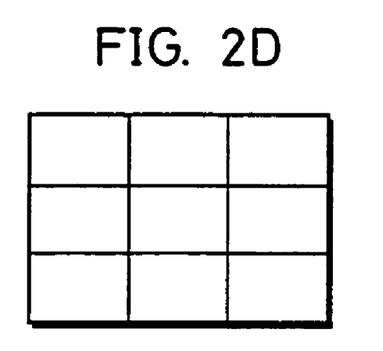
FIGS. 2D, 2E are diagrams showing a ⅑ multi-display format for the display unit.
Figure 2E:
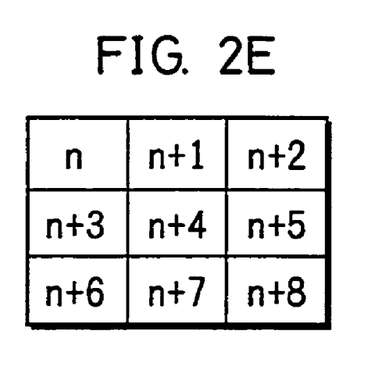

The display unit 6 shown in FIG. 1A includes a liquid crystal display (LCD) panel for displaying an image thereon in accordance with image data sent from the image processing unit 4. Display modes for images to be displayed on the display unit 6 are shown in FIGS. 2A to 2E. FIG. 2A is a diagram showing a normal display format for the display unit 6. FIG. 2B is a diagram showing a ¼ multi-display format for the display unit 6, wherein a maximum of four frame images are displayed in the display format of the LCD panel. FIG. 2C is a diagram showing an order in which the respective images are allotted to the respective sections of the ¼ multi-display format. FIG. 2D is a diagram showing a ⅑ multi-display format for the display unit 6, wherein a maximum of nine frame images are displayed in the display format of the LCD panel. FIG. 2E is a diagram showing an order in which the respective images are allotted to the respective sections of the 1/9 multi-display format. As can be understood from FIGS. 2A to 2E, the display unit 6 according to this embodiment displays images in any one of the normal display format, the 1/4 multi-display format, and the 1/9 multi-display format in accordance with a control signal from the control unit 7.

In accordance with operations made to the respective switches of the switch group 5 and the states thereof, the control unit 7 controls the storage medium 3 to write or read image data in or from the storage medium 3; controls the image processing unit 4 to pick up an object image, store image data obtained by the image pickup in the storage medium 3 and reproduce image data stored in the storage medium 3; and controls the display unit 6 to display an image. Further, the control unit 7 generates a tag information file for image data obtained by the image pickup. In the tag information file are written the date of image pickup, shutter speed, aperture value, distance data and information as to whether a flash was fired.

Figure 3:
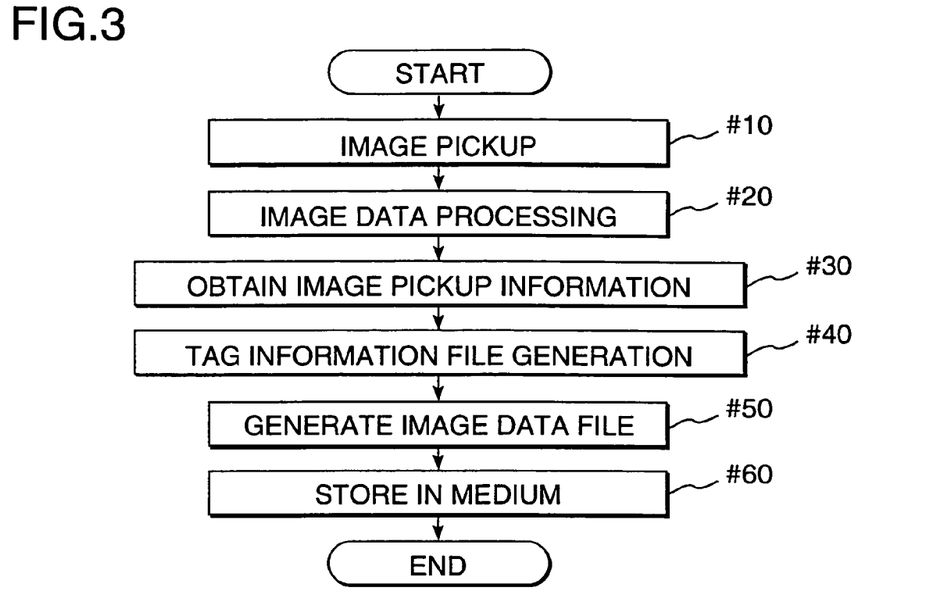
FIG. 3 is a flowchart showing an operation sequence of picking up and storing image data in a storage medium.

Next, operations of the camera 1 is described. FIG. 3 is a flowchart showing an operation sequence of picking and storing image data, that is, operations from turn on of the switch S2 to storing of picked-up image data in the storage medium 3. Specifically, after the main switch 51 is turned on to thereby activate the camera 1, the release button 52 is partly pressed to turn the switch S1 on for the image pickup preparation. Thereafter, when the release button 52 is fully pressed to turn the switch S2 on, the image sensor 22 senses an object image focused by the taking lens 21 and generates an electrical signal corresponding to a received light amount (Step #10). Here, it is assumed that the image pickup mode be set by the image pickup/reproduction switch 53. Unless the mode selection switch 54 is operated before the release button 52 is pressed, the Single Pickup Mode is automatically selected as an initial image pickup mode and the image signal for one frame is generated by the image sensor 22. On the other hand, if the mode selection switch 54 is operated to select the Continuous Pickup Mode before the release button 52 is pressed, an image signal representing frame image obtained by the image pickup repeatedly performed at the specified interval is generated by the image sensor 22. Alternatively, if the mode selection switch 54 is operated to select the Shutter Chance Mode, an image signal representing a frame image picked up when the switch S2 is turned on and a plurality of frame images before and after it is generated by the image sensor 22. These image signals are sent to the image processing unit 4.

After applying specified signal processing to the obtained image signal, the image processing unit 4 applies specified image processings to the obtained image data (Step #20).

Subsequently, the control unit 7 obtains information on the date and time of image pickup from a clock and also obtains the shutter speed, aperture value, distance data and information as to whether or not the flash was fired from the respective circuits (Step #30).

Figure 4:
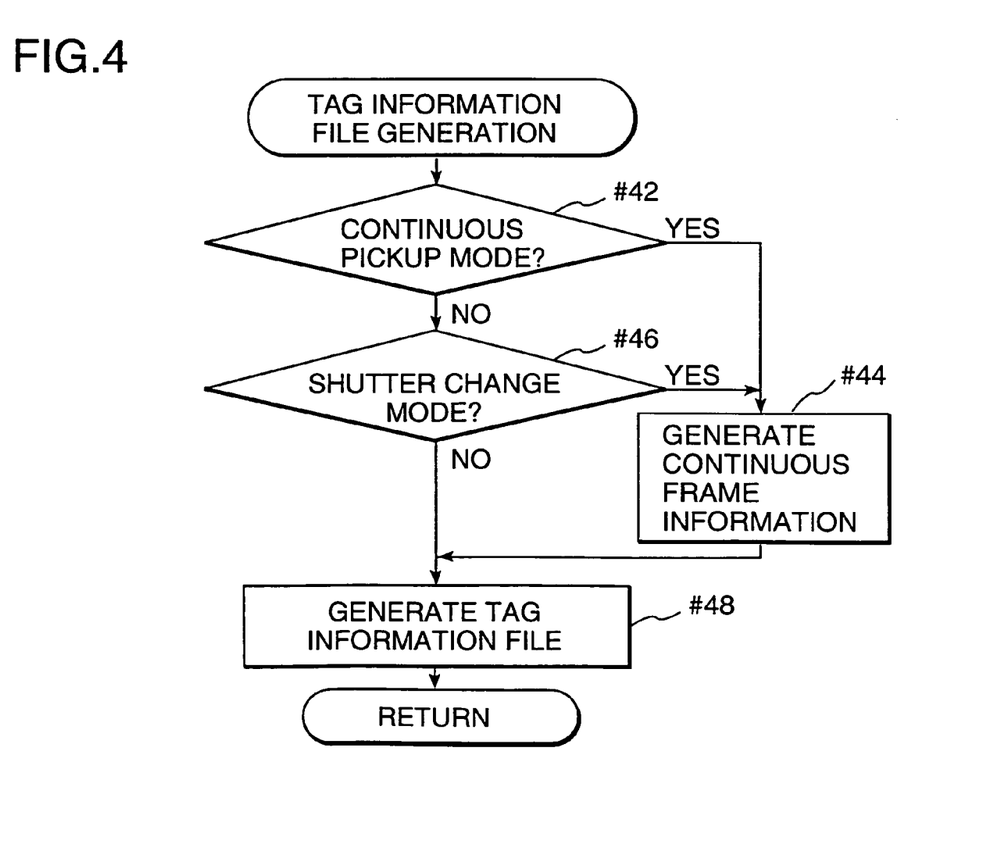
FIG. 4 is a flowchart showing a subroutine "Tag Information File Generation"

Thereafter, the control unit 7 executes the processing of a subroutine "Tag Information File Generation" (Step #40). This subroutine is shown in FIG. 4. First, it is discriminated whether the Continuous Pickup Mode was selected by the mode selection switch 54 before the operation of Step #10 of FIG. 3 (Step #42). If the Continuous Pickup Mode was selected by the mode selection switch 54, continuous frame information which represents that an image signal including a plurality of frame images was obtained by one image pickup is generated (Step #44).

Unless the Continuous Pickup Mode was selected by the mode selection switch 54, it is discriminated whether the Shutter Chance Mode was selected (Step #46). Step #44 follows if the Shutter Chance Mode was selected by the mode selection switch 54.

Unless the Shutter Chance Mode was selected by the mode selection switch 54, a tag information file in which the image pickup information obtained in Step #30 of FIG. 3 is generated (Step #48). At this time, if the continuous frame information was generated in Step #44, this continuous frame information is included in the generated tag information file. This tag information file is transferred to the image processing unit 4.

Thereafter, the image processing unit 4 allots the tag information file to the image data to which the image processing was applied in Step #20 of FIG. 3, thereby generating an image data file (Step #50 of FIG. 3) which is stored in the storage medium 3 (Step #60).

Figure 5:
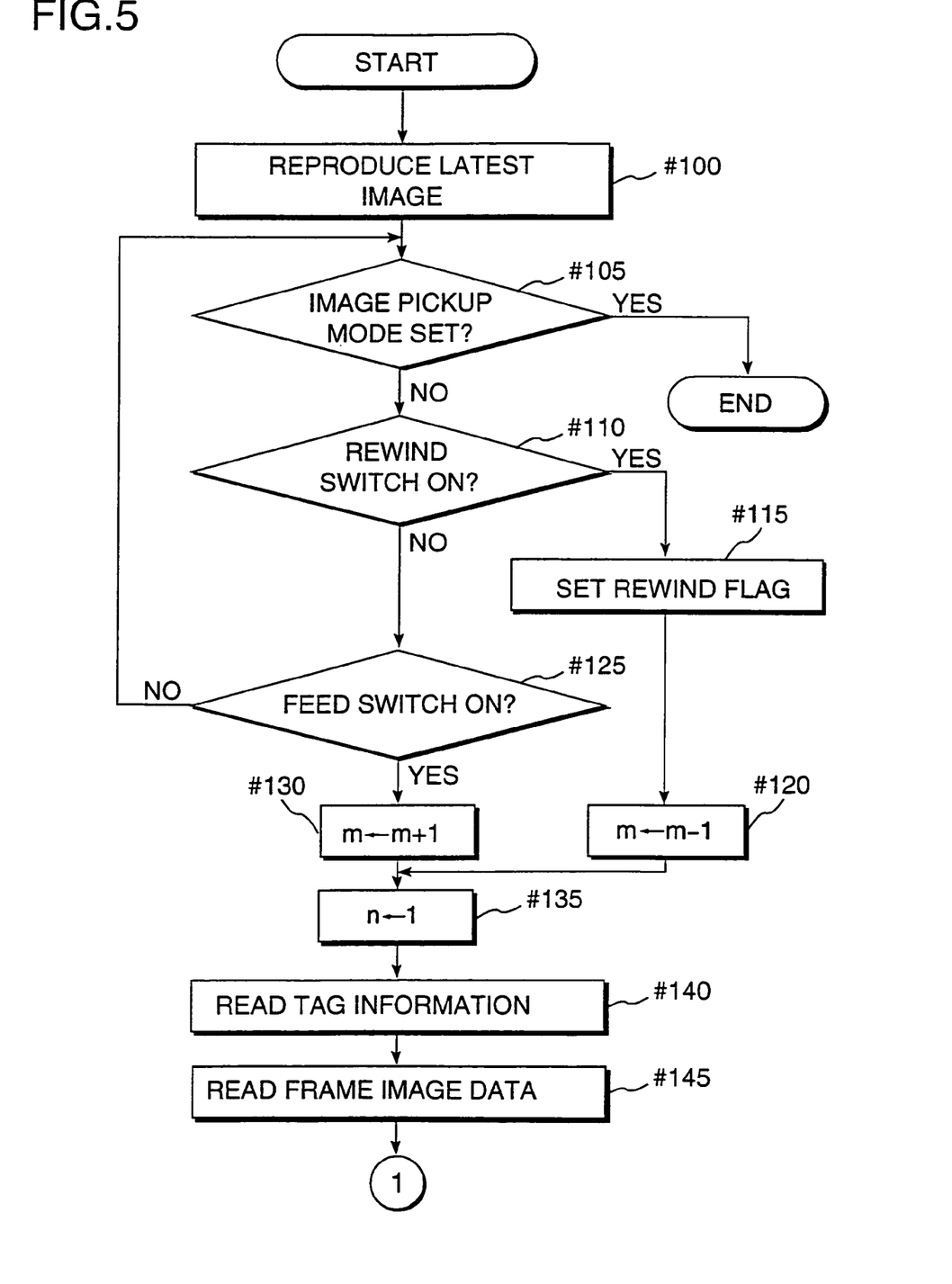
FIGS. 5 and 6 are a flowchart showing an operation sequence of Reproduction Mode I.

FIG. 5 is a flowchart showing a first half of the processing of the camera 1 set in the Reproduction Mode I. Specifically, if the Reproduction Mode I is selected by the mode selection switch 54 after the camera 1 is set in the reproduction mode by the image pickup/reproduction switch 53, the control unit 7 outputs a control signal and causes the reading of the latest image data file stored in the storage medium 3. The read image data file is reproduced into an image data by the image processing unit 4 and an image corresponding to the tag information file in the image data file is sent to the display unit 6 (Step #100). Specifically, the display unit 6 displays the image in the normal display format shown in FIG. 2A if no continuous frame information is included in the image data file. On the other hand, if the continuous frame information is included in the image data file, the display unit 6 displays images in the 1/4 or 1/9 multi-display format shown in FIG. 2B or 2D. Here, a value representing the frame number of the image displayed in the display unit 6 is substituted for a reproduced frame number "m" used in the following processing.

Thereafter, it is discriminated whether the image pickup/reproduction switch 53 has been switched to set the image pickup mode (Step #105). If the discrimination result is in the affirmative, the processing of this flowchart ends. It should be noted that a flowchart of the image pickup mode is executed thereafter.

Unless the image pickup/reproduction switch 53 has been switched to set the image pickup mode, it is discriminated whether the frame rewind switch 56 has been turned on (Step #110). If the frame rewind switch 56 is discriminated to have been turned on, a frame rewind flag is set (Step #115); the reproduced frame number "m" is decreased one (Step #120); and the continuous frame number "n" is reset to "1" (Step #135).

If the frame rewind switch 56 is discriminated not to have been turned on in Step #110, it is discriminated whether the frame feed switch 55 has been turned on (Step #125). If the discrimination result is in the negative, this routine returns to Step #105. If the frame feed switch 55 is discriminated to have been turned on, the reproduced frame number "m" is increased one (Step #130) and Step #135 follows.

Thereafter, the control unit 7 outputs a control signal to cause the reading of the tag information file in the image data file including the frame image specified by the reproduced frame number "m" from the storage medium 3. The read tag information file is transferred to the image processing unit 4 (Step #140). Specifically, if the frame rewind flag is set, the tag information file allotted to a frame image picked up one frame before the oldest frame image displayed on the display unit 6 is read. Unless the frame rewind flag is set, the tag information allotted to a frame image picked up one frame after the latest frame image displayed on the display unit 6 is read.

Similarly, the control unit 7 outputs a control signal to cause the reading of the frame image data specified by the reproduced frame number "m" from the storage medium 3. The read frame image is transferred to the image processing unit 4 (Step #145). Further, the value of the continuous frame number "n", i.e., "1" is allotted to the transferred image data.

Figure 6:
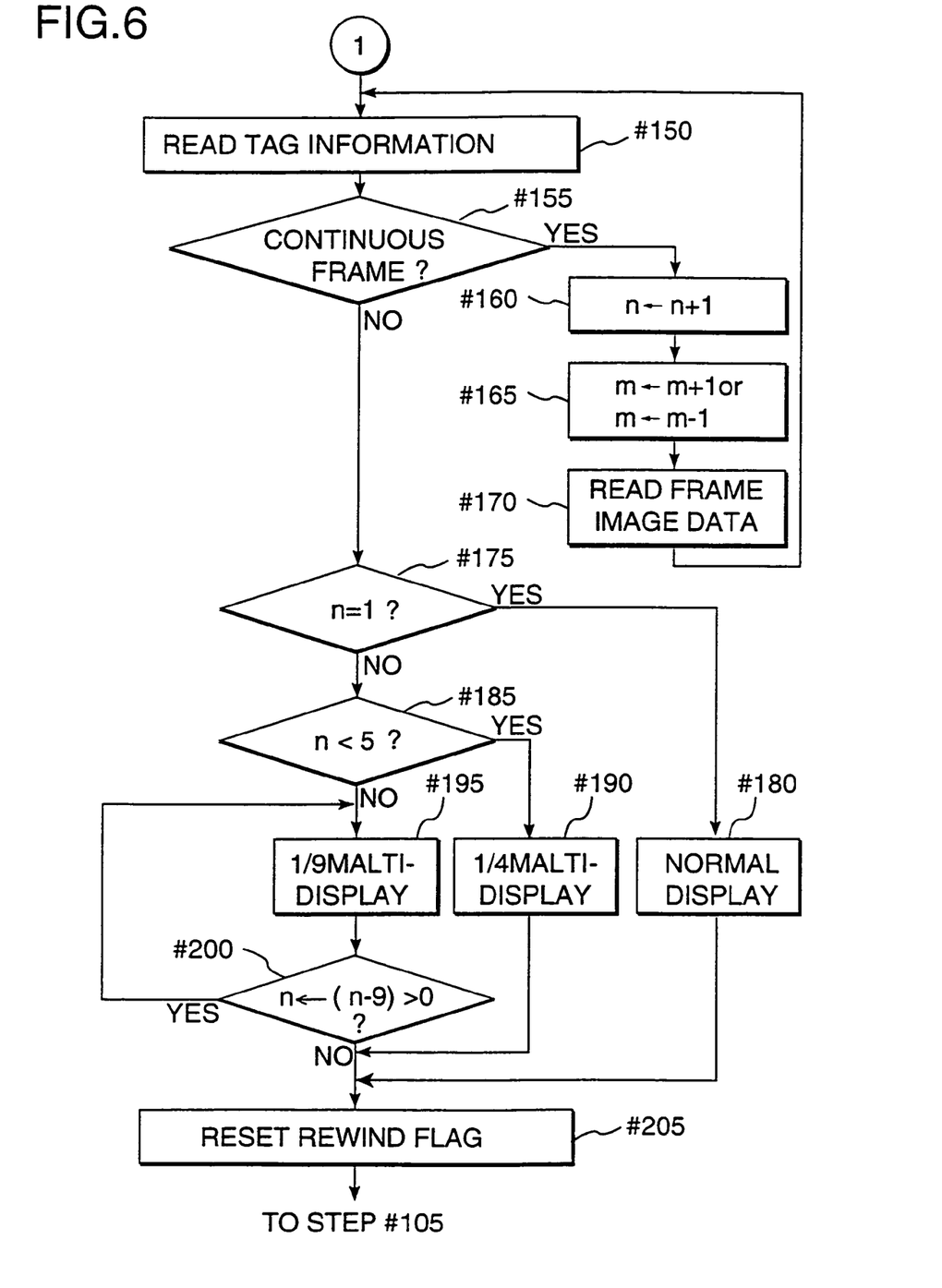

FIG. 6 is a flowchart showing a second half of the processing of the camera 1 set in the Reproduction Mode I. After the operation of Step #145 of FIG. 5, the control unit 7 outputs a control signal to cause the reading of the tag information file allotted to an other frame image from the storage medium 3 (Step #150). Specifically, if the frame rewind flag is set, the tag information file allotted to a frame image picked up one frame before the oldest frame image displayed on the display unit 6 is read. Unless the frame rewind flag is set, the tag information allotted to a frame image picked up one frame after the latest frame image displayed on the display unit 6 is read.

Thereafter, it is discriminated whether both of the two tag information files obtained in Steps #140, #150 include the continuous frame information (Step #155). Specifically, if it is discriminated that both of the two tag information files include the continuous frame information, the frame images to which these tag information files are allotted are discriminated to have been picked up one after another. On the other hand, if it is discriminated that neither of the two tag information files includes the continuous frame information, the frame images to which these tag information files are allotted are discriminated not to have been picked up one after another. The embodiment is not limited to this. For example, it may be discriminated whether the two tag information files obtained in Steps #140, #150 are both the same (Step #175).

If the continuous frame number is discriminated to be "1", the frame image specified by the continuous frame number "1" is displayed in the normal display format on the display unit 6 as shown in FIG. 2A (Step #180). Thereafter, the frame rewind flag is reset (Step #205) and this subroutine returns to Step #105 of FIG. 5.

If the continuous frame number "n" is discriminated not to be "1", it is discriminated whether the continuous frame number "n" is smaller than "5" (Step #185). If the continuous frame number "n" is discriminated to be smaller than "5", "n" frame images specified by the values "1" to "n" of the continuous frame number "n" are displayed in the ¼ multi-display format on the display unit 6. For example, if the value of the continuous frame number "n" is "4", four frame images specified by "1", "2", "3", "4" are displayed in upper left, upper right, lower left and lower right sections of the display format on the display unit 6 as shown in FIG. 2C (Step #190).

If the continuous frame number "n" is discriminated not to be smaller than "5", "n" frame images specified by the values "1" to "n" of the continuous frame number "n" are displayed in the ⅑ multi-display format on the display unit 6. At this time, if the value of the continuous frame number "n" is "9", nine frame images specified by "1", "2", "3", "4", "5", "6", "7", "8", "9" are displayed in upper left, upper center, upper right, middle left, middle center, middle right, lower left, lower center and lower right sections of the display format on the display unit 6 as shown in FIG. 2E (Step #195).

Thereafter, "9" is subtracted from "n" and it is discriminated whether the calculation result is larger than "0" (Step #200). Step #195 follows if it is discriminated to be larger than "0", whereas Step #205 follows if it is discriminated not to be larger than "0".

It should be noted that the respective values obtained from the continuous frame number "n" and used in Steps #190, #195 in the case that the frame rewind flag is set may be arranged in a reverse order. By doing this, the frame images are displayed on the display unit 6 in time sequence.

Figure 7:
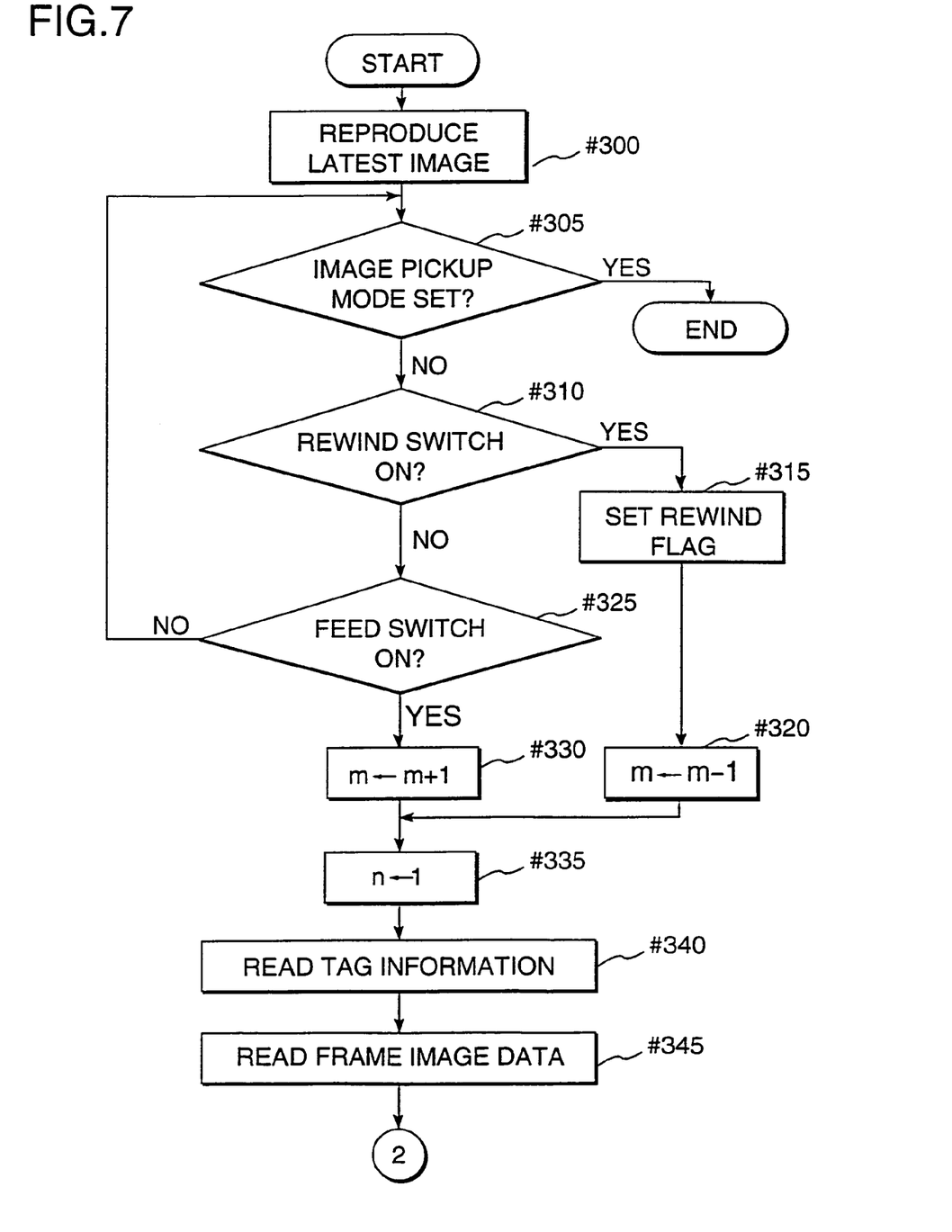
FIGS. 7 and 8 is a flowchart showing an operation sequence of Reproduction Mode II.

FIG. 7 is a flowchart showing a first half of the processing of the camera 1 set in the Reproduction Mode II. Here, since Steps #305 to #345 are identical to Steps #105 to #145 of FIG. 5, respectively, no description is given thereon and only Step #300 is described. If the Reproduction Mode II is selected by the mode selection switch 54 while the camera 1 is set in the reproduction mode by the image pickup/reproduction switch 53, the control unit 7 outputs a control signal to cause the reading of a latest image data file stored in the storage medium 3. The read image data file is reproduced into image data by the image processing unit 4 and sent to the display unit 6 in accordance with the tag information file in the image data file. As a result, the image corresponding to the tag information file is displayed on the display unit 6. Specifically, the display unit 6 displays one frame image in the normal display format shown in FIG. 2A if no continuous frame information is included in the image data file. On the other hand, if the continuous frame information is included in the image data file, the display unit 6 displays the respective frame images one by one in the normal display format while successively feeding them at a specified interval.

Figure 8:
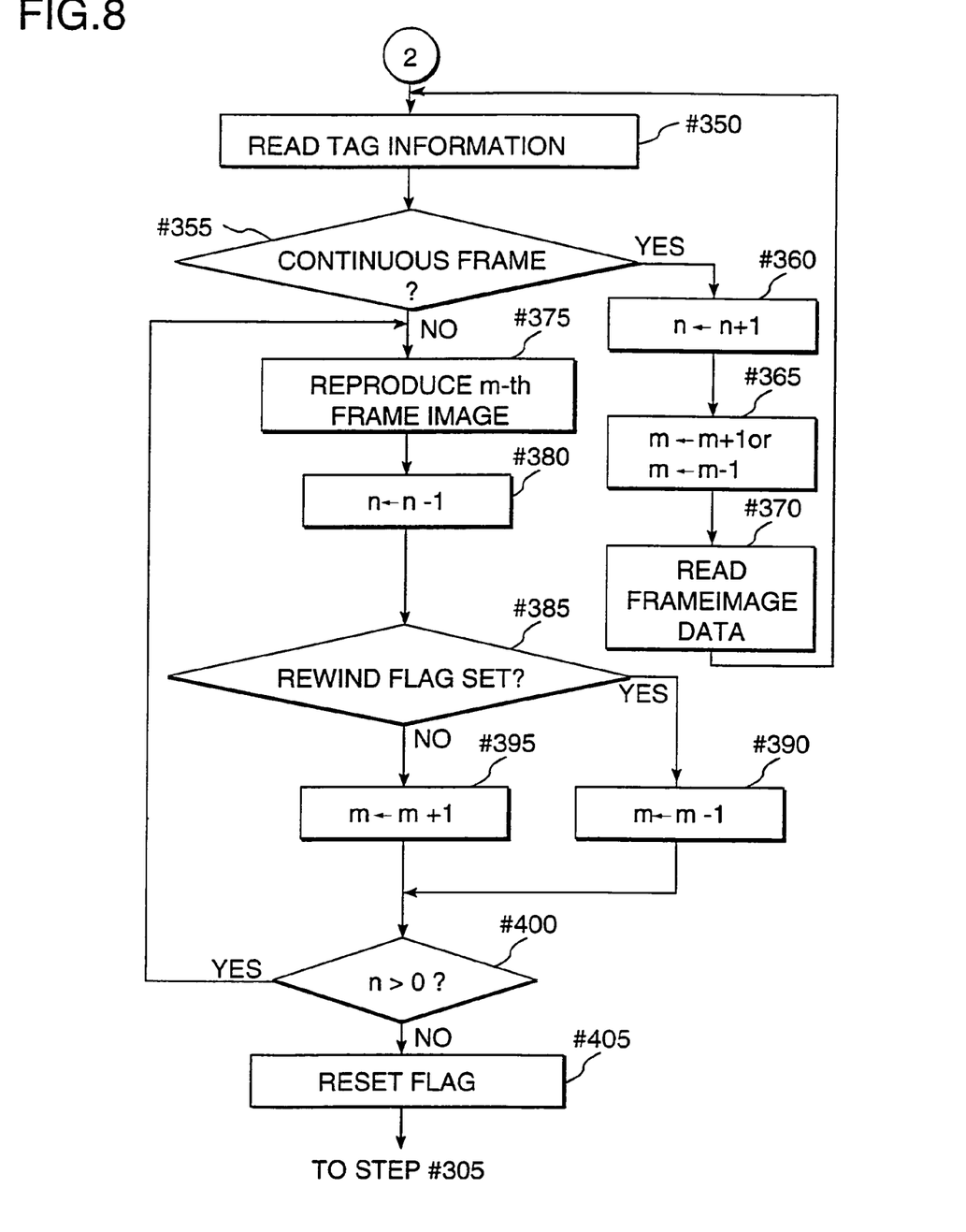

FIG. 8 is a flowchart showing a second half of the processing of the camera 1 set in the Reproduction Mode II. Here, since Steps #350 to #370 are identical to Steps #150 to #170 of FIG. 6, respectively, no description is given thereon and only Step #375 and subsequent Steps are described. If the frame images are discriminated not to have been picked up one after another in Step #355, the control unit 7 outputs a control signal to cause the reading of the frame image data specified by the reproduced frame number "m" from the storage medium 3. The read frame image data is transferred to the image processing unit 4 and sent to the display unit 6 after being reproduced into image data. As a result, the reproduced frame image is displayed in the normal display format on the display unit 6 (Step #375).

Thereafter, the continuous frame number "n" is decreased one (Step #380) and it is discriminated whether the frame rewind flag is set (Step #385). The reproduced frame number "m" is decreased one (Step #390) if the frame rewind flag is discriminated to be set, whereas it is increased one (Step #395) if the frame rewind flag is discriminated not to be set.

Thereafter, it is discriminated whether the continuous frame number "n" is larger than "0" (Step #400). Step #375 follows if the continuous frame number "n" is discriminated to be larger than "0", whereas the frame rewind flag is reset (Step #405) and Step #305 of FIG. 7 follows if it is discriminated not to be larger than "0".

Thus, the respective frame images included in the image data file are displayed in the normal display format while being fed at a specified interval.

As is clear from the above description, a plurality of frames of object images obtained by the continuous image pickup can be reproduced with maximal circumstances and atmospheres during the image pickup in view of continuity.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An electronic still camera comprising:
an image pickup unit which picks up an object image to generate a frame image, the image pickup unit having a single pickup mode of picking up the object image to generate a single frame image, and a continuous pickup mode of picking up the object image continuously to generate a plurality of continuous frame images, the continuous pickup mode including a plurality of continuous pickup modes, each continuous pickup mode being different from a mode designating an output television scheme;
a display unit which displays the frame image; and
a controller which controls the display unit to display the frame image in a display manner specialized to the pickup mode in which the frame image is generated, wherein
the display manner specialized to the single pickup mode is to display in a format of a single frame image, and
the display manner specialized to the continuous pickup mode is to display in a format of a plurality of continuous frame images at the same time,
when a total number of the plurality of continuous frame images is less than or equal to an X number of frame images, the total number of the plurality of continuous frame images are displayed in single display of the display unit in a format of X frame images, and
when the total number of the plurality of continuous frame images is greater than X number of frame images, the total number of the plurality of continuous frame images are displayed in continuous frame order via multiple displays of the display unit in the format of X frame images, each of the multiple displays in the format of X frame images is displayed at a specified interval.

2. The electronic still camera according to claim 1, wherein the display manner specialized to the continuous pickup mode is to display in a format of a plurality of continuous frame images at the same time,
when a total number of the plurality of continuous frame images is less than or equal to an X number of frame images, the total number of the plurality of continuous frame images are displayed in single display of the display unit in a format of X frame images,
when the total number of the plurality of continuous frame images is less than or equal to Y number of frame images, the total number of the plurality of continuous frame images are displayed in single display of the display unit in a format of Y frame images, and
when the total number of the plurality of continuous frame images is greater than Y number of frame images, the total number of the plurality of continuous frame images are displayed in continuous frame order via multiple displays of the display unit in the format of Y frame images, each of the multiple displays in the format of Y frame images is displayed at a specified interval.

3. An electronic still camera comprising:
an image pickup unit which picks up an object image to generate a frame image, the image pickup unit having a single pickup mode of picking up the object image to generate a single frame image, and a continuous pickup mode of picking up the object image continuously to generate a plurality of continuous frame images, the continuous pickup mode including a plurality of continuous pickup modes, each continuous pickup mode being different from a mode designating an output television scheme;
a display unit which displays the frame image, the display unit displaying the frame image in a display manner specialized to the pickup mode in accordance with pickup mode information given to the frame image
a mode setter which selectively sets one of the single pickup mode and the continuous pickup mode;
a pickup mode information generator which generates pickup mode information for each frame image, the pickup mode information representing whether the frame image is generated in the single pickup mode or the continuous pickup mode; and
a storage medium which is operable to store frame images and pickup mode information respectively given to the frame images, wherein
the display manner specialized to the single pickup mode is to display in a format of a single frame image, and
the display manner specialized to the continuous pickup mode is to display in a format of a plurality of continuous frame images at the same time,
when a total number of the plurality of continuous frame images is less than or equal to an X number of frame images, the total number of the plurality of continuous frame images are displayed in single display of the display unit in a format of X frame images, and
when the total number of the plurality of continuous frame images is greater than X number of frame images, the total number of the plurality of continuous frame images are displayed in continuous frame order via multiple displays of the display unit in the format of X frame images, each of the multiple displays in the format of X frame images is displayed at a specified interval.

4. The electronic still camera according to claim 3, wherein the display manner specialized to the continuous pickup mode is to display in a format of a plurality of continuous frame images at the same time,
when a total number of the plurality of continuous frame images is less than or equal to an X number of frame images, the total number of the plurality of continuous frame images are displayed in single display of the display unit in a format of X frame images,
when the total number of the plurality of continuous frame images is less than or equal to Y number of frame images, the total number of the plurality of continuous frame images are displayed in single display of the display unit in a format of Y frame images, and
when the total number of the plurality of continuous frame images is greater than Y number of frame images, the total number of the plurality of continuous frame images are displayed in continuous frame order via multiple displays of the display unit in the format of Y frame images, each of the multiple displays in the format of Y frame images is displayed at a specified interval.

5. A frame image reproducer for reproducing single frame images and a plurality of continuous frame images stored in a memory, the single frame images being generated in a single pickup mode, the plurality of continuous frame images being generated in a continuous pickup mode, the continuous pickup mode including a plurality of continuous pickup modes, each continuous pickup mode being different from a mode designating an output television scheme, the reproducer comprising:

a frame image reader which reads a frame image from the memory;

a discriminator which discriminates whether a read frame image is generated in the single pickup mode or the continuous pickup mode; and a display unit which displays, based on a result of the discriminator, the read frame image in a display manner specialized to the pickup mode in which the frame image is generated, wherein the display manner specialized to the single pickup mode is to display in a format of a single frame image, and the display manner specialized to the continuous pickup mode is to display in a format of a plurality of continuous frame images at the same time, when a total number of the plurality of continuous frame images is less than or equal to an X number of frame images, the total number of the plurality of continuous frame images are displayed in single display of the display unit in a format of X frame images, and when the total number of the plurality of continuous frame images is greater than X number of frame images, the total number of the plurality of continuous frame images are displayed in continuous frame order via multiple displays of the display unit in the format of X frame images, each of the multiple displays in the format of X frame images is displayed at a specified interval.

6. The frame image reproducer according to claim 5, wherein the display manner specialized to the continuous pickup mode is to display in a format of a plurality of continuous frame images at the same time, when a total number of the plurality of continuous frame images is less than or equal to an X number of frame images, the total number of the plurality of continuous frame images are displayed in single display of the display unit in a format of X frame images, when the total number of the plurality of continuous frame images is less than or equal to Y number of frame images, the total number of the plurality of continuous frame images are displayed in single display of the display unit in a format of Y frame images, and when the total number of the plurality of continuous frame images is greater than Y number of frame images, the total number of the plurality of continuous frame images are displayed in continuous frame order via multiple displays of the display unit in the format of Y frame images, each of the multiple displays in the format of Y frame images is displayed at a specified interval.

7. A method for picking up an object image electronically, the method comprising the steps of:

providing an operator with selection of either a single pickup mode of picking up the object image to generate a single frame image or a continuous pickup mode of picking up the object image continuously to generate a plurality of continuous frame images, the continuous pickup mode including a plurality of continuous pickup modes, each continuous pickup mode being different from a mode designating an output television scheme;

performing image pickup in accordance with a selected pickup mode; and displaying a frame image in a display manner specialized to the pickup mode in which the frame image is generated, wherein the display manner specialized to the single pickup mode is to display in a format of a single frame image, and the display manner specialized to the continuous pickup mode is to display in a format of a plurality of continuous frame images at the same time, when a total number of the plurality of continuous frame images is less than or equal to an X number of frame images, the total number of the plurality of continuous frame images are displayed in single display of the display unit in a format of X frame images, and when the total number of the plurality of continuous frame images is greater than X number of frame images, the total number of the plurality of continuous frame images are displayed in continuous frame order via multiple displays of the display unit in the format of X frame images, each of the multiple displays in the format of X frame images is displayed at a specified interval.

8. The method according to claim 7, wherein the display manner specialized to the continuous pickup mode is to display in a format of a plurality of continuous frame images at the same time, when a total number of the plurality of continuous frame images is less than or equal to an X number of frame images, the total number of the plurality of continuous frame images are displayed in single display of the display unit in a format of X frame images, when the total number of the plurality of continuous frame images is less than or equal to Y number of frame images, the total number of the plurality of continuous frame images are displayed in single display of the display unit in a format of Y frame images, and when the total number of the plurality of continuous frame images is greater than Y number of frame images, the total number of the plurality of continuous frame images are displayed in continuous frame order via multiple displays of the display unit in the format of Y frame images, each of the multiple displays in the format of Y frame images is displayed at a specified interval.

9. An electronic still camera comprising:

an image pickup unit which picks up an object image to generate a frame image, the image pickup unit having a single pickup mode of picking up the object image to generate a single frame image, and a continuous pickup mode of picking up the object image continuously to generate a plurality of continuous frame images, the continuous pickup mode including a plurality of continuous pickup modes, each continuous pickup mode being different from a mode designating an output television scheme;

a display unit which displays the frame image; and a controller which controls the display unit to display the frame image in a display manner specialized to the pickup mode in which the frame image is generated, wherein at least one display manner specialized to the continuous pickup mode is displaying at the same time a plurality of the frame images photographed in the continuous pickup mode, and displaying in a format of a plurality of continuous frame images at the same time includes displaying in a first format of a plurality of continuous frame images when there are no more than a first plurality of continuous frame images and displaying in a second format of a plurality of continuous frame images when there are more than the first plurality of continuous frame images, the second format displaying a greater number of continuous frame images at the same time than the first format.

10. An electronic still camera comprising:

an image pickup unit which picks up an object image to generate a frame image, the image pickup unit having a single pickup mode of picking up the object image to generate a single frame image, and a continuous pickup mode of picking up the object image continuously to generate a plurality of continuous frame images, the continuous pickup mode including a plurality of continuous pickup modes, each continuous pickup mode being different from a mode designating an output television scheme;

a display unit which displays the frame image, the display unit displaying the frame image in a display manner specialized to the pickup mode in accordance with pickup mode information given to the frame image;

a mode setter which selectively sets one of the single pickup mode and the continuous pickup mode;

a pickup mode information generator which generates pickup mode information for each frame image, the pickup mode information representing whether the frame image is generated in the single pickup mode or the continuous pickup mode; and a storage medium which is operable to store frame images and pickup mode information respectively given to the frame images, wherein at least one display manner specialized to the continuous pickup mode is displaying at the same time a plurality of the frame images photographed in the continuous pickup mode, and displaying in a format of a plurality of continuous frame images at the same time includes displaying in a first format of a plurality of continuous frame images when there are no more than a first plurality of continuous frame images and displaying in a second format of a plurality of continuous frame images when there are more than the first plurality of continuous frame images, the second format displaying a greater number of continuous frame images at the same time than the first format.

11. A frame image reproducer for reproducing single frame images and a plurality of continuous frame images stored in a memory, the single frame images being generated in a single pickup mode, the plurality of continuous frame images being generated in a continuous pickup mode, the continuous pickup mode including a plurality of continuous pickup modes, each continuous pickup mode being different from a mode designating an output television scheme, the reproducer comprising:

a frame image reader which reads a frame image from the memory;

a discriminator which discriminates whether a read frame image is generated in the single pickup mode or the continuous pickup mode; and a display unit which displays, based on a result of the discriminator, the read frame image in a display manner specialized to the pickup mode in which the frame image is generated, wherein at least one display manner specialized to the continuous pickup mode is displaying at the same time a plurality of the frame images photographed in the continuous pickup mode, and displaying in a format of a plurality of continuous frame images at the same time includes displaying in a first format of a plurality of continuous frame images when there are no more than a first plurality of continuous frame images and displaying in a second format of a plurality of continuous frame images when there are more than the first plurality of continuous frame images, the second format displaying a greater number of continuous frame images at the same time than the first format.

12. A method for picking up an object image electronically, the method comprising the steps of:

providing an operator with selection of either a single pickup mode of picking up the object image to generate a single frame image or a continuous pickup mode of picking up the object image continuously to generate a plurality of continuous frame images, the continuous pickup mode including a plurality of continuous pickup modes, each continuous pickup mode being different from a mode designating an output television scheme;

performing image pickup in accordance with a selected pickup mode; and displaying a frame image in a display manner specialized to the pickup mode in which the frame image is generated, wherein at least one display manner specialized to the continuous pickup mode is displaying at the same time a plurality of the frame images photographed in the continuous pickup mode, and displaying in a format of a plurality of continuous frame images at the same time includes displaying in a first format of a plurality of continuous frame images when there are no more than a first plurality of continuous frame images and displaying in a second format of a plurality of continuous frame images when there are more than the first plurality of continuous frame images, the second format displaying a greater number of continuous frame images at the same time than the first format.

* * * * *